(12) United States Patent
Wagner et al.

(10) Patent No.: US 6,454,343 B1
(45) Date of Patent: Sep. 24, 2002

(54) MULTI-PART COVER FOR VEHICLES

(75) Inventors: Tobias Wagner, Hamburg; Jörg Brettmann, Sottrum, both of (DE)

(73) Assignee: CTS Fahrzeug-Dachsysteme GmbH, Hamburg (DE)

(*) Notice: Subject to any disclaimer, the term of this patent is extended or adjusted under 35 U.S.C. 154(b) by 0 days.

(21) Appl. No.: 09/966,308

(22) Filed: Sep. 28, 2001

(51) Int. Cl.[7] .................................................. B60J 7/00
(52) U.S. Cl. ............................ 296/107.08; 296/107.09; 296/100.01
(58) Field of Search ....................... 296/107.08, 107.01, 296/108, 107.09

(56) References Cited

U.S. PATENT DOCUMENTS

| | | | | |
|---|---|---|---|---|
| 1,748,736 A | * | 2/1930 | Selje ..................... | 296/107.08 |
| 2,747,928 A | * | 5/1956 | Olivier et al. ......... | 296/107.08 |
| 2,959,447 A | | 11/1960 | Stebbins et al. | |
| 4,668,006 A | * | 5/1987 | Wagner .................. | 296/136 |
| 5,064,241 A | * | 11/1991 | Ohrle ..................... | 292/DIG. 5 |
| 5,197,778 A | * | 3/1993 | Burst ..................... | 296/136 |
| 5,246,262 A | * | 9/1993 | Schrader et al. ....... | 296/108 |
| 5,975,619 A | * | 11/1999 | Dettling et al. ........ | 296/107.08 |
| 6,010,178 A | * | 1/2000 | Hahn et al. ............ | 296/107.08 |
| 6,019,416 A | * | 2/2000 | Beierl .................... | 296/107.07 |
| 6,145,915 A | * | 11/2000 | Queveau et al. ....... | 296/107.08 |
| 6,149,221 A | * | 11/2000 | Mentink ................ | 296/107.08 |
| 6,299,233 B1 | * | 10/2001 | Mentink ................ | 296/107.09 |
| 6,318,792 B1 | * | 11/2001 | Neubrand et al. ..... | 296/107.08 |
| 2001/0005086 A1 | * | 6/2001 | Neubrand .............. | 296/107.08 |
| 2001/0040386 A1 | * | 11/2001 | Miklosi et al. ........ | 296/107.08 |
| 2002/0041109 A1 | * | 4/2002 | Wagner et al. ........ | 296/107.08 |

FOREIGN PATENT DOCUMENTS

| | | | |
|---|---|---|---|
| DE | 3816060 A1 | * | 11/1989 |
| DE | 39 39 145 | | 5/1991 |
| DE | 197 12 967 | | 10/1998 |
| DE | 44 46 483 | | 6/2001 |
| EP | 0 302 963 | | 11/1991 |

* cited by examiner

*Primary Examiner*—Kiran Patel
(74) *Attorney, Agent, or Firm*—Klaus J. Bach (57) ABSTRACT

In a multi-part cover for a vehicle top storage compartment of a convertible vehicle with removable top, which cover includes a center part and adjacent side parts which, for opening the storage compartment are movable out of the positions adjacent the center part into an overlapping position with the center part while undergoing a height displacement, the side parts are elastic resiliently connected to the center parts. Stops are provided on the vehicle body, by which the side parts are engaged when the cover is closed so that the side parts are biased against the elastic support into a reference plane defined by the center part for flush alignment with the center part.

30 Claims, 8 Drawing Sheets

MULTI-PART COVER FOR VEHICLES

BACKGROUND OF THE INVENTION

The invention relates to a multi-part cover particularly for the storage compartment in the body of convertibles for storing the vehicle top.

Multi-part covers for top storage compartments of convertibles are known, for example, from DE 197 12 967 A1. They consist of a center part and side parts, which are disposed at the sides of the center part and smoothly fitted to the center part when the vehicle cover is closed. The side parts are supported by the center part and connected to the center part by way of a pivot-slide joint in such a way that, by level displacement, they are moved from the original closed position, in which the center part and the side parts are disposed in a reference plane determined by the center part, to a position relative to the center part in which they overlap the center part. In this overlap position, the side parts are disposed essentially below the center part. The relative movement of the side parts with respect to the supporting center part is achieved by a hydraulic drive mechanism, when the necessary timing of translating and pivot movements requires additional design and control efforts.

Another multi-part vehicle cover, which functionally corresponds to the one just described, is disclosed in DE 44 46 483 A1. It consists of a center part formed by two center sections and side parts disposed at the sides of the center part. The two center sections are formed by panels of which the, in travel direction of the vehicle, front panel, which extends over the vehicle seats, forms a first cover part whereas the rearwardly adjacent panel forms a second cover part that consists of two panel sections. The two panel sections of the second cover part are interconnected along a pivot axis extending transverse to the vehicle and can be pivoted-folded against one another into a pivot position normal to the first cover part.

The cover parts are supported at the side each by a slide track on which they are longitudinally slidable. The slide track extending in the longitudinal direction of the vehicle is part of a guide unit. The guide unit itself is movable with respect to a guide track of the guide unit, which is firmly mounted on the vehicle body. The relative movability of the cover parts and the slide tracks are utilized to form a storage shelf adjacent the inside of the cover when the vehicle cover is closed and the various cover parts of the cover unit are arranged in a contiguous manner forming a cover plane. When the top is opened and stored away, the gap formed between the cover parts and the rear vehicle lid is covered by the cover unit which, for that purpose assumes a rearwardly displaced cover position.

During transition, that is, the movement of the top from it closed position to its storage position in the top storage compartment, access is provided to the storage compartment in that the two cover sections of the second cover part are folded against one another and arranged in an upright position with respect to the first cover part, while the slide track and the first cover part are in a front position with respect to the vehicle travel direction.

At opposite sides of the second top part, there are the side parts which are extended to the center part formed by the two cover sections only when the top is deposited in the storage compartment. In all other positions of the cover unit the side parts are pivoted inwardly over the second cover part. This occurs while the respective side part is propped up by a pivot block, which is in a stationary position with respect to the front panel of the second top part and which is operatively connected to the guide unit such that, depending on the position of the guide unit, the respective side part is raised from a position flat with the cover part and is pivoted inwardly over the cover part or, respectively, is pivoted out of the inwardly pivoted position into a position coplanar with the cover part.

Another multi-part cover is disclosed in U.S. Pat. No. 2,959,447. It serves for covering the rear seat area of convertible vehicles. In this design, the side parts are supported by the center part by way of pivot axes which extend parallel to a reference plane which includes center part and side parts when the cover is closed. They are spring loaded toward their position alongside the center part in which they are disposed in the reference plane defined by the center part. Depending on the pivot amount of the center part away from the cover position into an open position, the side parts are pivoted with respect to the center part against the force of a spring into an overlapping position with the center part.

In another design as disclosed in DE 39 39 145 A1, the side parts of the cover which includes a center part and side parts are supported on the vehicle body by way of vertical pivot axis and the pivot movement of the side parts below the center part is coupled with a longitudinal translation of the center part in the direction toward the pivot axes of the side parts which pivot axes are stationary with respect to the vehicle body.

EP 0 302 963 B1 discloses a top storage cover for convertibles, wherein the center part of the cover, which comprises a center part and side parts, is integrally formed with a vertical back wall that forms a separation structure between the vehicle interior and the top storage containment. The backwall again is pivotally mounted with its bottom edge to the vehicle body so as to be pivotable about a transverse vehicle axis. By tilting the back wall and, together therewith, the center part toward the interior of the vehicle, the center part can be transferred into an open position. With the pivot movement of the back wall forwardly toward the vehicle interior in connection with the pivotal support of the side parts about a vertical pivot axis, the side parts can be pivoted toward the longitudinal center axis of the vehicle into overlapping position with the center part.

It is the object of the present invention to provide a multi-part cover for a convertible vehicle top storage space which cover is movable between a closed position and an open position. In the closed position the vehicle top storage compartment with the vehicle top disposed therein is covered and the cover side part are disposed flush with the center part. They are supported in this position in a stable manner but, during the transfer of the multipart cover between its closed and open positions, the side parts are easily movable into an overlapping position with the center part of the cover.

SUMMARY OF THE INVENTION

In a multi-part cover for a vehicle top storage compartment of a convertible vehicle with removable top, which cover includes a center part and adjacent side parts which, for opening the storage compartment are movable out of the positions adjacent the center part into an overlapping position with the center part while undergoing a height displacement, the side parts are elastic resiliently connected to the center parts. Stops are provided on the vehicle body, by which the side parts are engaged when the cover is closed so that the side parts are biased against the elastic support into a reference plane defined by the center part for flush alignment with the center part.

With this arrangement, the transfer of the side parts into an overlapping position with the center part is facilitated. The height displacement of the side parts with respect to the center part is accommodated during closing of the cover by an engagement of the side parts with stops which are preferably part of the vehicle body and so arranged that, in a closed position of the center part the side parts are biased into a position flush with the center part of the cover so that they are all disposed in a common reference plane.

The firm support of the side parts relative to the center part by way of vehicle body supports and the utilization of these supports in the displacement of the side parts into a surface-flush position with the center part during the transition of the cover from its open to its closed position may be realized—within the scope of the invention—with covers which are as a whole pivotable between a closed and an open position, particularly about an axis extending transverse to the longitudinal vehicle axis. Such support may also be obtained in connection with covers which are slidably supported at least over part of the movement between the open and closed positions wherein the slide and pivot movements may also be combined. Preferably, the slide or pivot movements of the cover are employed during movement of the cover to the closed or out of the closed position in order to bring the side parts of the cover in contact with the supports or to move them away from the supports so that they can be biased into the reference plane that is into a flush position with the center part or out of this position into a height displaced position with respect to the reference plane for the transfer into an overlapping position with the center part.

In a particularly advantageous embodiment, the multi-part cover is utilized in connection with convertible vehicle tops wherein a common drive is provided for the vehicle top and the multipart cover. In that case, the common drive is engaged for transferring the multipart cover between the open and close positions only when the top is already, or is still, disposed in the storage compartment. This applies to the opening as well as the closing of the top. For driving the side parts with respect to the center part, the relative motion between the cover as a whole and the top operating linkage is utilized which is available for that purpose only when the top is already, or still is, disposed in the storage compartment.

For the connection of the side parts to the center part, it is advantageous to provide the center part with a support member and connect the side parts to the support member in such a way that the side parts can assume a height different from the reference plane which is defined by the center part and in which the side parts are disposed flush with the center part when the cover is closed.

It is however also within the scope of the invention to make the support member itself of an elastic material for example to provide a support member in the form of a leaf spring, which is deformed when the side part engages the stop to such an extent that the side part can be moved into a position flush with the center part.

Particularly, if the support member is rigid and is supported with respect to the center part by way of a pivot pin, which is vertical with respect to the reference plane and determines the pivot axis of the respective side part, the side part can be connected to the support member so as to be pivotable or movable parallel to the reference plane. A pivot connection is particularly suitable if, for a transfer of the side part into an overlapping position with the center part, the side part must first only be height-displaced in the area where it joins the center part so that the side part is inclined with respect to the reference plane wherein the side part is, in the direction of the height displacement, partially still in an overlapping position with the center part. During movement into the overlapping position, the crossing position is eliminated in that the pivot axis of the support member is arranged slightly inclined with respect to a line extending vertically to the reference plane so that, during the pivot movement, the height of the side part with respect to the reference plane is also changed.

Particularly in connection with such a pivot connection between the support member and the side part it is advantageous to connect the support member in the area of its free end to the side part by a pivot axis, wherein the support member is preferably disposed in an area of the side part on which there is a wide overlap between the side part and the support member so that a large pivot radius is available which provides the necessary height displacement with a relatively small pivot angle.

The support member or respectively, the pivot axis in the connection between the support member and the center part is preferably arranged opposite to that area of the center part in which the side part pivots into its overlapping position with the center part.

It is also within the scope of the invention to arrange the side part so as to be movable parallel to the support member for example by way of leaf spring guide structures. Such an arrangement is particularly advantageous if the support member is supported on the center part so as to be slidable in a transverse direction that is if it is movable essentially parallel to the reference plane so that the side parts can move from the side into an overlapping position with the center part when they are displaced in height relative to the reference plane.

Additional features and details of the invention will become apparent from the following description of preferred embodiments thereof shown, by way of example only, in the accompanying drawings.

DESCRIPTION OF A PREFERRED EMBODIMENT

Figure 1:
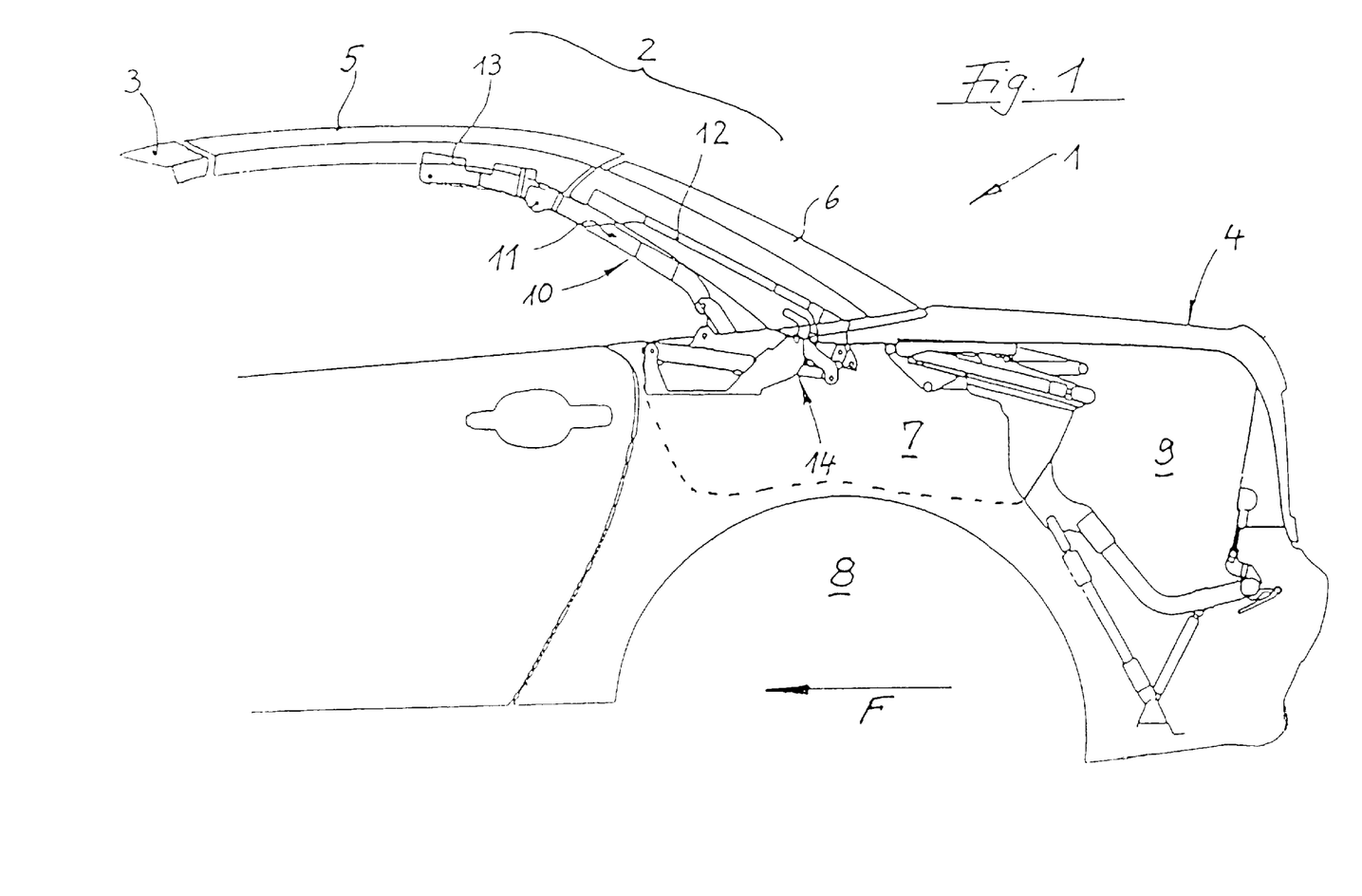
FIG. 1 shows, in a highly schematic representation, a part of a vehicle with a convertible top whose top guide structure is only shown in principle, and which includes a storage compartment for the top and a cover for the storage compartment.

FIG. 1 is a schematic representation of the rear part of a vehicle 1, which includes a top 2, which can be opened and which extends between a windshield frame 3 and a rear trunk lid 4. The top 2 is formed in this example by a so-called hardtop, which includes a top part 5 adjoining the windshield frame 3 and a rear window part 6. When the top 2 is opened, the top part 5 and the rear window part 6 are disposed in a top storage compartment 7, which extends essentially above the wheel wells 8 between the vehicle interior and the trunk 9. The top storage compartment 7 extends also partially into the trunk 9.

The operating mechanism for the top part 5 and the rear window part 6 comprises a guide structure with a four-joint linkage 10, which is shown only schematically and which includes a front support link 11, a rear support link 12 and a coupling 13. The coupling 13 is firmly connected to the top part 5 and the support links 11 and 12 are mounted pivotally to the vehicle body. The rear support link 12 is firmly connected to the rear window part 6 and may be formed by the rear window part; the front support link 11 is linked to the coupling 13 and may consist of several parts. Such guide structures are, in connection with top part 5 and the rear window part 6 provided in a symmetrical arrangement at both sides of the vehicle and comprise each also a drive 14 shown as an operating cylinder.

For moving the top into or out of the top storage compartment 7, the storage compartment 7 must first be opened. In a design as shown in FIG. 1, the top storage compartment is covered partially by the trunk lid 4 and partially by a cover which is not shown in FIG. 1.

This cover design is shown in FIGS. 2 to 6 and is designated by the numeral 119. In addition, FIGS. 7–10 show schematically particularly suitable embodiments for combined top and cover operating mechanisms by a common operating drive. In the FIGS. 7–9, the cover 119 is shown, for simplicity reasons, as a single part element. These figures also exemplify the movement of the cover 119 as a whole. The drive connection for operation of the side parts 15, which is branched off the drive of the center part 150 is indicated in FIG. 10.

Figure 7:
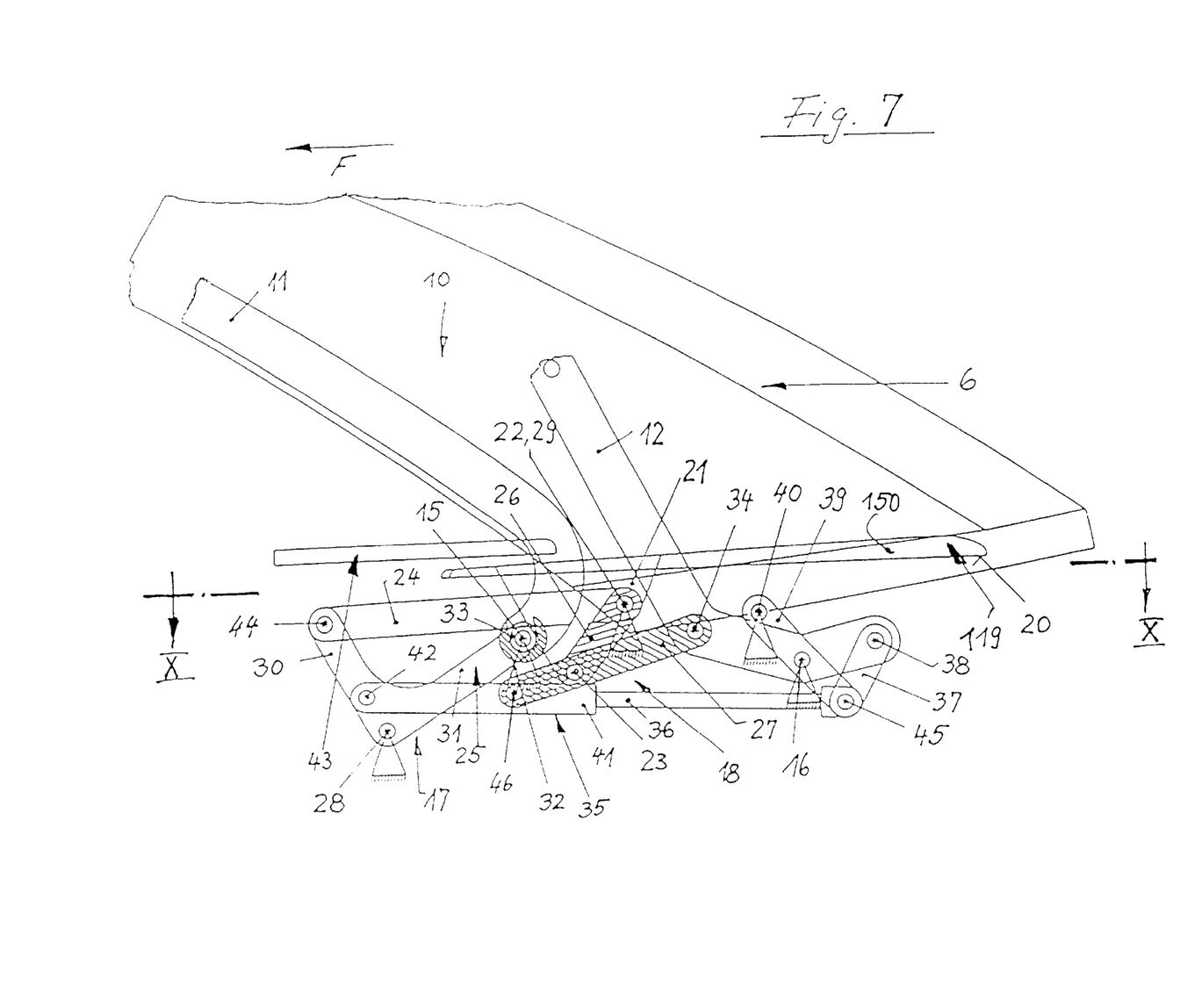
FIG. 7 is a schematic representation of an operating mechanism for a cover for a top which is shown in the closed position, but which is to be deposited in a storage compartment with a cover operating mechanisms operatively connected to the top operating mechanism.
Figure 8:
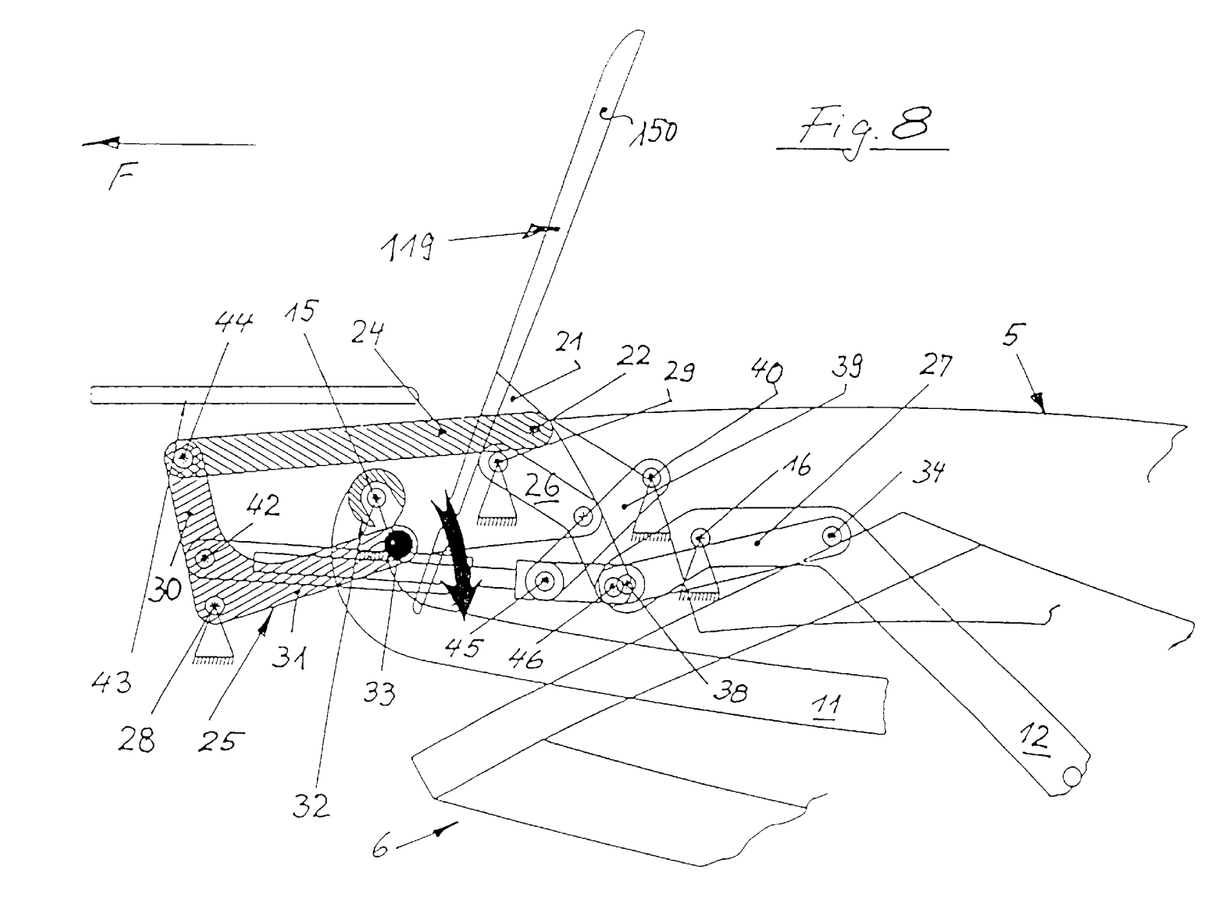
FIG. 8 shows an intermediate position of the cover and the top already deposited in the storage compartment.
Figure 9:
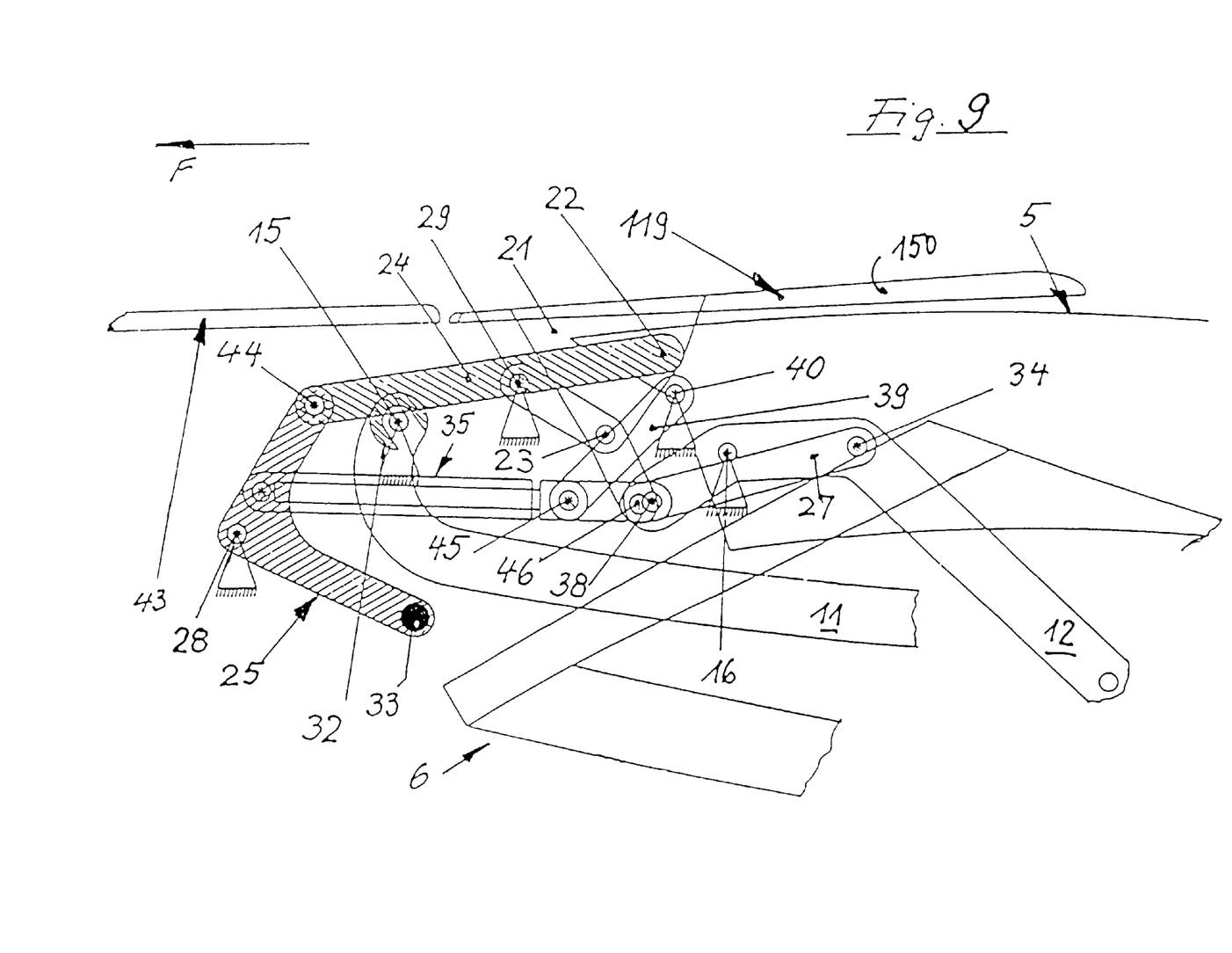
FIG. 9 shows the cover in its final position covering the top storage compartment.
Figure 10:
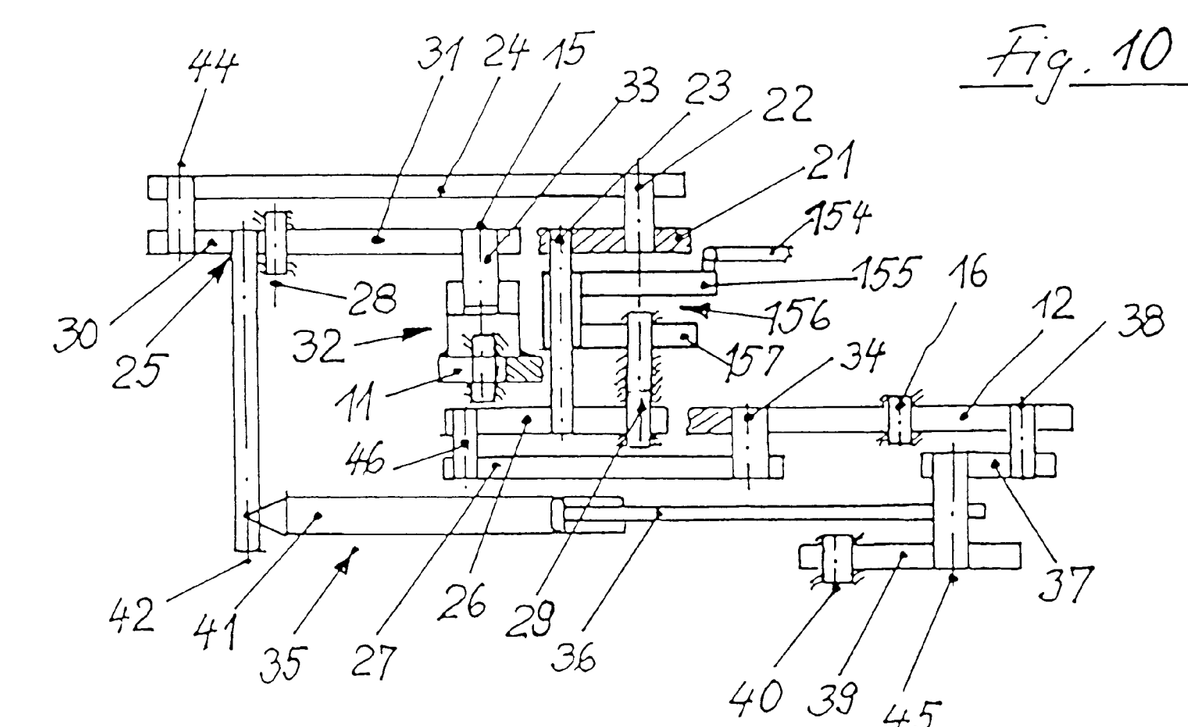
FIG. 10 is a schematic cross-sectional view taken along line X—X of FIG. 7 slightly modified for showing the functional interrelations, the cross-section being taken through the operating mechanism for the cover and the interconnection thereof with the operating mechanism for the top.

For an understanding of the representations of FIGS. 7 to 9, it is pointed out that, with the movement pattern of the four-joint linkage 10, the rear window part 6 is disposed upside down in the storage compartment 7, that is, the side, which is disposed adjacent the vehicle interior when the top is closed, faces upwardly and is covered by the top part 5, which is in its normal orientation that is with the outer top skin disposed on top.

FIG. 1 makes it clear that the cover 119 of the top storage compartment 7 which, in travel direction F, is disposed in front of the trunk lid 4, cannot be disposed directly adjacent the trunk lid 4 since the top 2 with its rear window part 6 is disposed between these cover areas. This requires that the cover 119 is longitudinally displaced upon movement between the position it assumes when the top is closed and when it is open if the cover 119 is to cover also the area which is taken up by rear window part 6 when the cover 119 is open and the top 2 is deposited in the top storage compartment.

The cover indicated as a whole by the reference numeral 119 consists of a center part 150 and side parts 151 which however are shown only partially since the cover 119 is symmetrical so that only one of the side parts needs to be shown. The side parts 151 adjoin the center part 150 in sideward extension (FIG. 3) and are so connected to the center part 150 that they can be moved from their side position with respect to the center part 150 (FIGS. 2 and 3) to an overlap position with the center part (FIGS. 4 and 5).

In this way, it is taken into account that, with the top closed, the cover 119 must provide space for the linkage 10 and 11. On the other hand, the cover 119 should cover with its center part 150 the top storage compartment 7 and form a storage shelf. With the top 2 open, the top storage compartment 7 should be covered by the cover 119 in the area, which is disposed ahead of the trunk lid 4.

Figure 4:
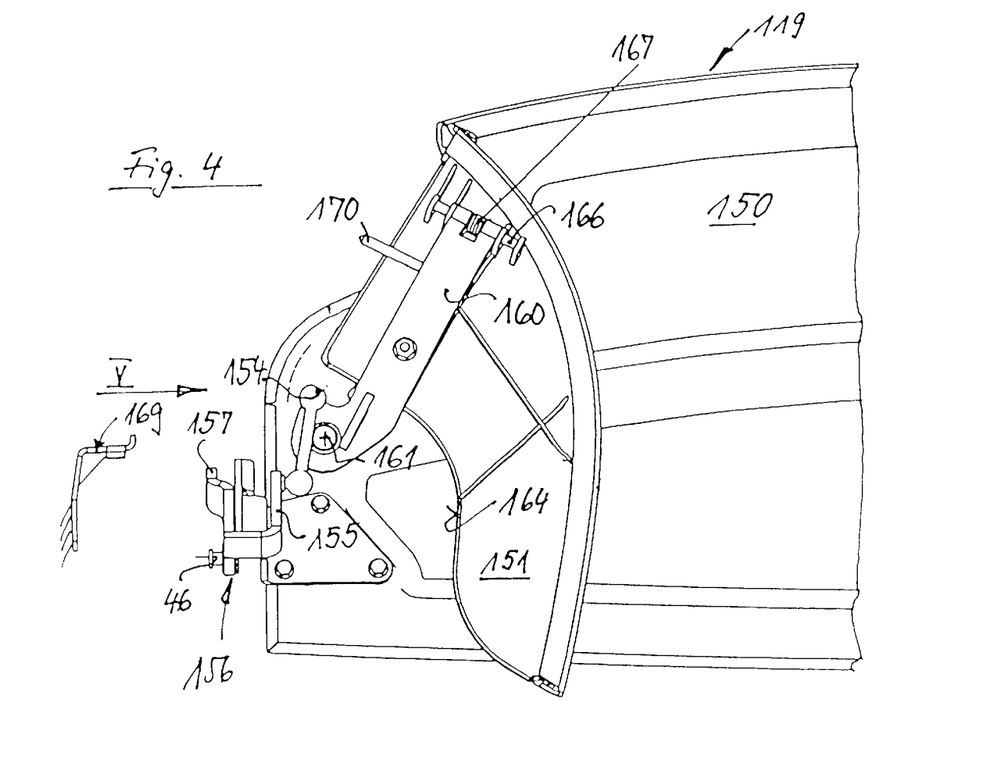
FIG. 4 is another partial view of the multipart cover in an upwardly pivoted position as shown in FIG. 5, but viewed from the rear according to arrow IV, wherein the side parts of the cover are pivoted inwardly into an overlapping position with the center part.
Figure 5:
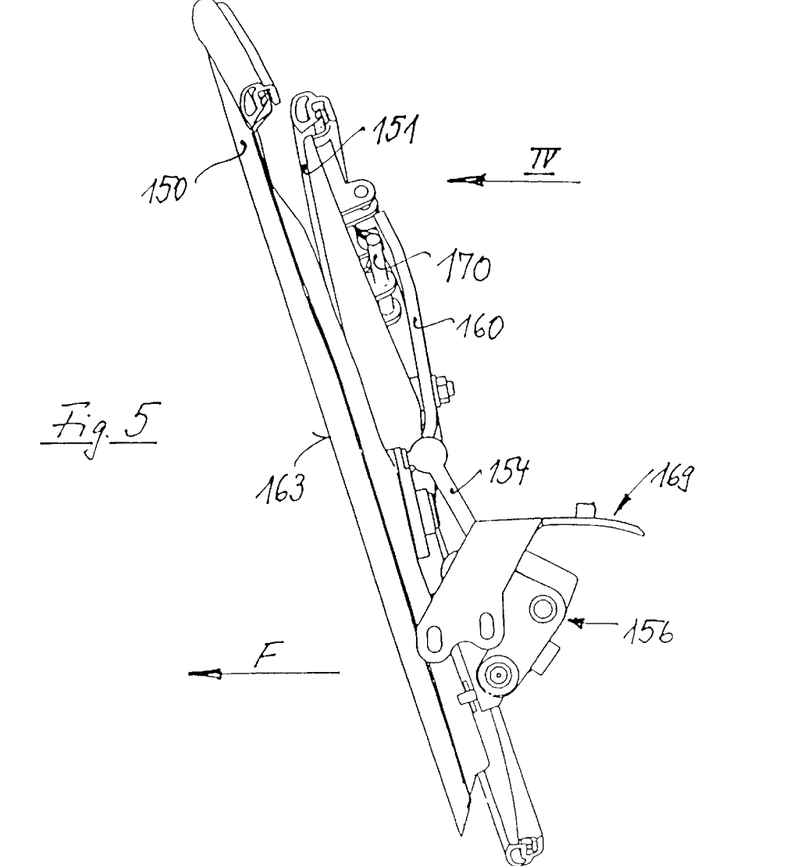
FIG. 5 is a side view of the cover in the direction of arrow IV in FIG. 4 in an open position in which it is pivoted forwardly out of the way to permit movement of the top through the opening.

When the side parts 151 are disposed at the side of the center part 150, the cover 119 is to be disposed flush with the center part 150, preferably in a sealing relationship, which requires that, during the transfer of the side parts 151 into the overlapping position with the center part 150 as shown in FIG. 4, there is a height displacement between the center part 150 and the side parts 151.

This is achieved with the arrangement according to the invention in that the side parts 151 have, at least adjacent the center part 150, a height-displaced design position and, depending on the position of the whole cover 119, are brought into the desired flush position with the center part 150 when the cover as a whole assumes its closed position.

In the position of the side parts 151 in which they are flush with the center part 150, those parts of the cover 119 are disposed in a reference plane which is determined by the center part 150. The side parts 151 are connected to the center part 150 by way of a support member 160, which is disposed at the underside of the cover 119 and is linked to the center part 150 pivotable about a pivot axis 161, which extends normal with respect to the reference plane 163 (FIG. 6) and is formed, for example, by a pin 162. Concerning the side position of the side parts 151 with respect to the center part 150, the support member 160 extends in transverse vehicle direction wherein the support member 160 as shown in FIG. 6 is disposed in spaced relationship below the underside of the side part 151 that is from the reference plane indicated in FIG. 6 by reference numeral 163 with a predetermined height displacement.

With regard to the desired pivotability of the side parts 151 into an overlapping position with the center part 150 as shown in FIG. 4, the side parts 151 are resiliently connected to the support member 160 in the direction of the height displacement. With regard to the embodiment shown, they are so connected resiliently that as indicated in FIG. 6 by the reference numeral 151', that they are height displaced in the area 164 of the joints thereof to the center part 150. The amount of the height displacement can be limited by a stop member 165 attached to the support member 160.

Figure 3:
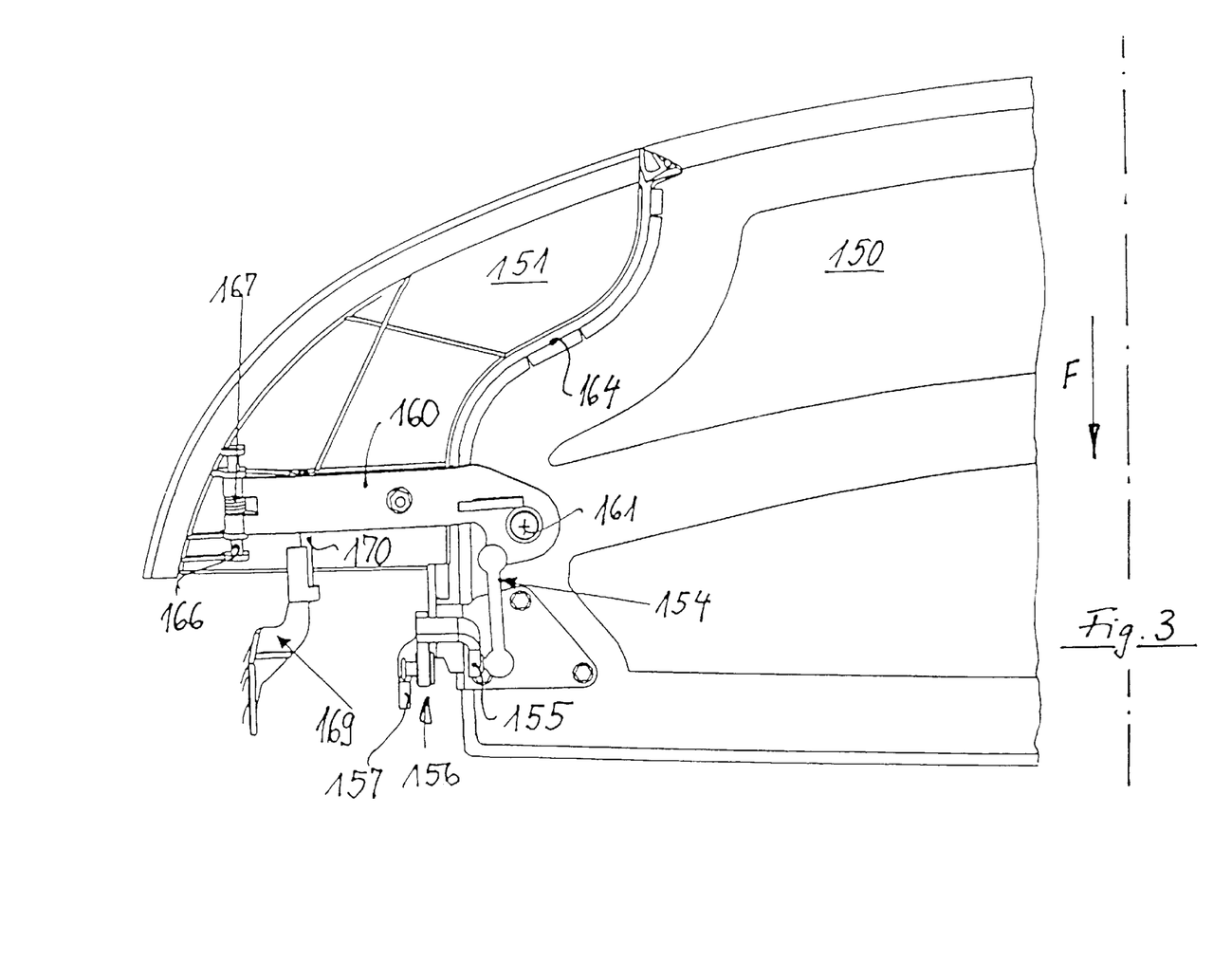
FIG. 3 shows the cover of FIG. 2 as seen in the direction of the arrow III of FIG. 2, that is, from below wherein the multipart cover which is symmetrical with respect to the longitudinal vehicle center plane is only partially shown.

The spring-like elastic support of the side part 151 with respect to the support member 160 is achieved in the embodiment shown in that the side part 151 is pivotally connected to the free end of the support member 160 as shown in FIG. 3 by a pivot pin 166, which joins the support member 160 and/or the side part 131 and which forms a support member for the torsional coil spring 167. The torsional coil springs 167 has arms engaging the support member 160, and respectively, the side part 151 so that the side part 151 is lowered with respect to the reference plane 163 onto the support member 160 in its area 164 adjacent the center part 150 (position 151').

Figure 6:
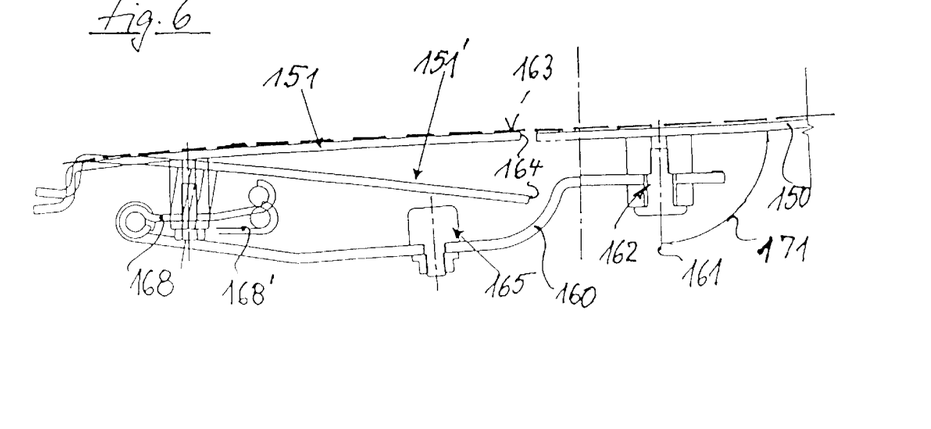
FIG. 6 shows schematically in a cross-sectional view the connection of a side part to the center part of the cover in a position at one side of the center part in accordance with FIGS. 2 and 3.

FIG. 6 shows another possible solution for a resilient spring-like support of the side part 151 with respect to the support member 160. In this case, a leaf spring-like support element 168 is connected with the support member 160 which support element is indicated in a height displaced position corresponding to its design position by ref. No. 168'. The support element 168 can be pivoted with respect to the support member 160 toward the reference plane 163 and supports the side part 151. In its position as indicated by the reference numeral 168, the position of the support member corresponds to the position of the side part 151 in which it is biased out of its design portion into a position flush with the center part 150.

It is not shown that the support member 160 itself may be in the form of leaf spring element which provides for a position of the side part 151 corresponding to design position 151' that is to a position of displaced height with respect to the reference plane 163.

There are other possible embodiments not shown in the drawings, wherein the side part 151 is height-displaced with respect to the reference plane 163 so that, in design position, the side part 151 is essentially parallel to the reference plane 163 and can be raised from the position against its elastic support. The elastic support may be provided in this case for example by a double leg leaf spring element so that also a sufficient transverse guidance is provided thereby with regard to the support member 160.

If, as shown in the embodiment of FIG. 6, a height displacement of the side part 151 with respect to the reference plane is provided for in the design position only in the area 164 adjacent the center part 150, the pivot axis 161 is so inclined with respect to a vertical line on the reference plane 163 that, during pivoting of the side part 151 from a side position toward the center part 150 as shown in FIG. 3 into an overlapping position with respect to the center part 150 as shown in FIG. 4, a height displacement occurs for the side part 151 during its movement into the overlapping position, whereby the level of the side part 151 is changed also in those areas of the reference plane 163 which, in its design position, interfere with the reference plane 163 or, respectively, the center part 150. In this respect, FIG. 6 shows that, in a projection onto a vehicle transverse plane in which also the support member 160 is disposed, the pivot axis 161 extends with respect to the reference plane 163 at the side adjacent the side part 151, at an angle which is less than 90° and preferably about 85°. The opposite angle is indicated in FIG. 6 by the reference numeral 171.

Especially FIGS. 3 and 4 show that for the cover 119 a body stop 169 is provided whose direct or indirect attachment to the vehicle body is not shown and which is so arranged that, in the covering position of the cover 119 as shown in FIG. 3, the side part 151 overlaps with the cover 119 over a certain support area. This support area is indicated in the embodiment by a support pin 170, which extends from the side part 151 and which, in relation to the stop 169, is positioned at such a level that, when the side part reaches the cover position, the whole cover 119 is disposed flush with the center part 150. To achieve this, the side part 151 is biased, by cooperation of the stop 169 and the support pin 170, against its elastic spring support with respect to the support member 160 or, with an elastic support by way of the support member itself, into a flush position with respect to the outer part 150. This is indicated by the representation of a stop 169; however several such stops may be provided. It is also possible to arrange the stop movably so that it assumes the stop position only when it is needed, that is, with outwardly pivoted side part and closed or almost closed cover. For that purpose, the stop may be arranged movably with the top operating mechanism which assumes a fixed position when the top 2 is deposited in the storage compartment (FIGS. 7–9).

It is also within the scope of the invention to provide, by means of the stop 169, also for a positioning or securing of the cover 119 to prevent movement of the cover in longitudinal vehicle direction F. This can be achieved by providing for the stop 169 and the support pin 170 in their stop position a vertical covering. This also provides for a securing of the cover during an accident.

On the basis of the above described embodiment, the transfer of the side parts 151 into the overlapping position with the center part 150 by pivot movement has been described. It is however also within the scope of the invention to provide for the overlapping position by inward sliding of the side parts below the center part. This can be achieved with the same basic design—for example, by using the center part 150 to provide for a sideward movement of the support member 160. The side part 151 can engage a stop upon depositing the cover also with such an arrangement and can be biased into the reference plane for eliminating the height displacement.

With reference to the pivotable connection of the side parts 151 with the center part 150 in accordance with the embodiment disclosed, a pivoting mechanism is described wherein a reinforcement link 154 engages the support member 160 in spaced relationship from the pivot axis 161 and is connected to the support member 160 and a lever 156 by means of ball joints. The lever 156 is basically U-shaped and has a lever arm 155 which is connected to the link 154 and a lever arm 159, which is connected to the top 2. This connection is such that for the top 2 and the complete cover 119, that is, the center part 150 and the side parts 151, first a common movement phase is provided. During this phase, the movement of the top 2 in opening or closing direction out of the open or respectively, stored position is preceded by a movement of the cover 119. At the beginning of the opening movement or, respectively, the end of the closing movement of the cover 119, the center part 150 and the side parts 151 are adjusted relative to one another. The adjustment movement of the side parts 151 with respect to the center part 150 is achieved by retaining the side parts 151 by way of the reinforcement links 154 while the lever 156 is stationary and the center part 150 is further moved in the closing direction of the complete cover 119. Consequently, the movement of the complete cover 119 is utilized to transfer the side parts 151 to their side position with respect to the center part 150, in which, upon movement of the center part 150 opposite to the travel direction F, they engage the stop 169 since, with the pivot movements of the side parts 151, their front edge moves in travel direction.

FIGS. 7–8 show a suitable drive for the cover 119 coupled with the top 2 in such a way that, upon pivoting of the top 2 between the closed and open positions, the cover 119 is moved along. A common drive is provided which maintains its operating direction over the full opening phase and, during the closing phase, in an opposite operating direction.

In FIGS. 7 to 9, the four-part linkage for operating the top 2 is shown in a partial representation of the front support link 11 and the rear support link 12. The rear window 6 is shown schematically. The support links 11 and 12 have pivot axes 15 and 16, which are stationary with respect to the vehicle body.

Coupled to the support links 11 and, respectively, 12 are guide links 17 and 18, which control the movement of the complete cover 119 represented by the center part 150.

Figure 2:
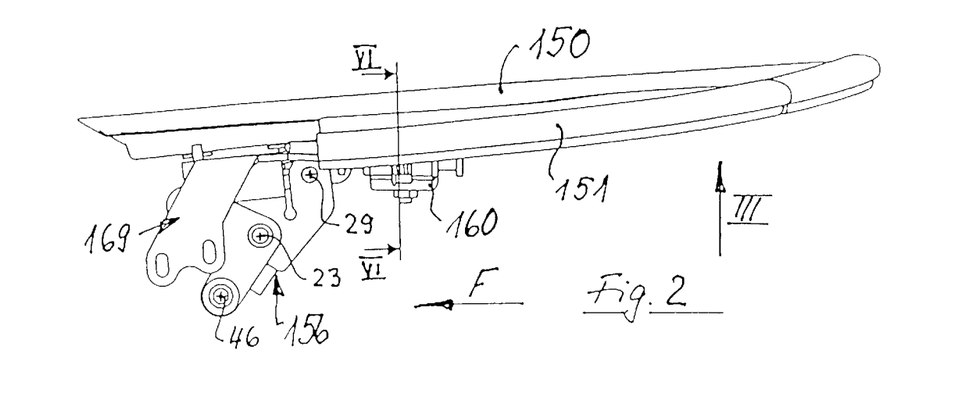
FIG. 2 is a partial side view of a cover for a top storage compartment.

FIG. 7 shows position of the cover 119 with closed top 2, FIG. 8 shows an intermediate position with the top 2 already deposited in the storage compartment 7 and FIG. 9 shows the final position, in which the storage compartment 7 is covered by the cover 119, that is, the cover 119 is in a position in which the side parts 151 are flush with the center part 150 as shown in FIGS. 2 and 3. In the position, as shown in FIG. 7, the side parts 151 are pivoted below the center part 150. FIG. 8 shows a phase wherein the top 2 has reached the storage position in the storage compartment 7 and the outward pivot movement of the side parts 151 is about to begin for the cover 119 as a result of the uncoupling of the movement with respect to the front and rear support links 11 and 12 and the relative movement of the center part 150 and the support links 11 and 12 as well as the guide links 17 and 18.

In the start-out position as shown in FIG. 7, in which the top 2 is closed and also the cover 119 is closed with the side parts 151 pivoted under the center part 150 according to FIG. 4, the cover 119 is disposed in travel direction in overlap with a body part 43. The amount of this overlap corresponds about to the size of the gap which, with closed top 2—FIG. 7, is formed by the rear window part 6 being in a transitional position between the cover 119 and the trunk lid 4.

At the underside 20 of the center part 150 of the cover 119, there is a support arm 21, which includes guide members 22 and 23, that are spaced in height in the direction of the height displacement between center part 150 and side part 151 when the side parts are in an overlap position with the center part 150 and, with respect to the representation of FIG. 7, vertically spaced from each other. In the first guide structure 22, the front guide linkage 17 and in the second guide structure 23, the rear guide linkage 18 are pivotally supported. The guide linkages 17 and 18 are each formed by a pair of levers. The levers of the guide linkage 17 are designated by the reference numerals 24 and 25 and the levers of the guide linkage 18 are designated by the reference numerals 26 and 27. Of the levers 24, 25, 26, 27 of each pair 17 and 18 of levers one is linked to the vehicle body that is the lever 25 for the linkage 17 and the lever 26 for the linkage 18. The pivot axes formed by these vehicle body attachments are designated by the reference numerals 28, and 29.

The lever 25 is angled and includes arms 30 and 31, which are inclined upwardly in different directions and by which the—in travel direction F—rear lever arm 31 is originally held—as shown in FIG. 7 with closed top—with its free end engaged in a U-shaped retaining structure 32 of the front support link 11 in a position concentric with the pivot axis 15 thereof. The U-shaped retaining structure 32 receives a lug 33 extending sidewardly from the lever arm 31 and is open upwardly so that, in the position of the support link 11 as shown in FIG. 7, it cannot pivot downwardly out of the retaining structure 32. At the free end of the other lever arm 30 of the lever 25, the lever 24 is connected by way of a pivot joint 44. The lever 24 extends—with respect to the position shown in FIG. 7—essentially parallel to the cover 119 and is connected to the support structure 21 at the upper first support point 22.

In the start-out position as shown in FIG. 7, this first support point 22 is disposed co-axially with the pivot axis 29 of the lever 26 of the guide link 13, which lever 26 is connected in its center area at a support point 22 to the support structure 21. At its other end, the lever 26 is connected at point 46 to the lever 27, which is connected to the rear support link 12 at a pivot point 34.

The rear support link 12 is operated by a drive device 35, which is effective for the actuation of the top 2 and also the cover 119. The drive device 35 is preferably a hydraulic operating cylinder 41. It includes a piston rod 36, which operates the rear support link 12 by way of a four-link transmission. The piston rod 36 is connected to the support link 12 by way of a connecting link 37, which is connected at point 38 to the end of the rear support link 12. The rear support link 12 extends beyond the pivot axis 16 and is supported at the support joint 40 by a support strut 39, which is pivotally mounted to the vehicle body by a support joint 40 and connected to the connecting link 37 co-axially with the piston rod 36.

At the opposite end of the drive 35, the cylinder 41 is supported by the lever arm 30 of the lever 25 in a pivot joint 42. The lever 25 again is supported on the body pivot support structure 28 and in the U-shaped retaining structure 32. When the drive 35 is shortened and the rear support link 12 is pivoted thereby, together with the front support link 11, in the direction toward the storage position of the top 2 in the storage compartment 7, the front support link 11 reaches a pivot position in which the U-shaped retaining structure 32 extends approximately tangentially to a circle centered with the pivot axis 28 and extending through the pivot axis 15 such that, under the force of the drive 35, the lever 25 moves the lug 33 out of the U-shaped retaining structure 32.

FIG. 8 shows the end position of the top 2 in the top storage compartment 7, wherein the lug 33 has just been released from the U-shaped retaining structure 32. The mass forces of the top 2 are effective to move the top toward this end position as soon as a certain position along the opening path of the top 2 is passed. The end position in the top storage compartment 7 represents a stop for the top 2 so that, upon further pivoting of the cover 119 in closing direction— applying a pulling force by way of the drive 35—the top 2 remains in its end position and only the cover 119 is moved toward its end position as shown in FIG. 9—that is a position in which the top storage compartment 7 is covered, with the top 2 disposed therein. When this end position, which is the closed position of the cover 119, has been reached both, the cover 119 and the top 2, are held in their end position in which the top 2 is removed from the vehicle interior.

Corresponding to the procedure as described with reference to FIGS. 7 to 9, the top closing procedure occurs in reversed order. Starting with the position as shown in FIG. 9, the drive device 35, held in position by the mass forces (weight) of the top 2, first lifts the cover 119 (FIG. 8). With further lifting of the lever 25 of the guide link 17 toward the U-shaped retaining structure 32 of the front support link 11 movement of the top out of the storage position is initiated and the lug 33 finally enters the U-shaped retaining structure 32.

At this point, the top operating linkage is in a start-out position, wherein the guide structure 22 forms the pivot point around which the guide structure 23 is pivoted by way of the lever 26 of the guide link 18. Upon further extension of the drive 35, the top 2 is lifted out of the storage compartment 7 and pivoted in closing direction. In this phase, the closing movement of the top 2 precedes the closing movement of the cover 119 with respect to the transfer thereof into the cover position as shown in FIG. 7.

For the operation of the cover 119, the relative motion between the cover 119 and the top 2 is utilized. Such relative motion occurs when the top 2 has reaches its end position in the top storage compartment 7 and the drive 35—after the release of the lug 33 from the U-shaped retaining structure—moves the cover 119 toward its end position covering the storage compartment 7. The overlapping relative motion between the center part 150 and the side parts 151 of the cover 119 is achieved in that, during movement of the center part 150, the side parts 151 are held in position and are pivoted in this way with respect to the center part 150. The side parts 151, which are supported on the center part 150, are connected to that end by way of the reinforcement links 154, with the lever 156. The lever 156 is connected by way of its lever arm. 157 to a stationary part of the operating mechanism for the top 2 and the cover 119 when the top 2 is deposited in the top storage compartment 7. For this purpose, the connection to the lever 26 as part of the guide link 18 is provided, wherein, vice versa, the lever arm 157 may also serve as the lever 26. A respective arrangement is shown in FIG. 10. In order to clarify the coordination, the connections associated with the lever 26 according to FIGS. 7 to 9, that is the pivot axis 29, the guide structure 23 and also the joint 46 are indicated in the representation of FIG. 2.

What is claimed is:

1. A multi-part cover for a convertible vehicle with removable top which can be deposited in a vehicle storage compartment provided in said vehicle, said multi-part cover including a center part and adjacent side parts which are supporting said center part and which, for opening said storage compartment, are movable out of their position at opposite sides of said center part, in which they are disposed flush with the center part in a reference plane defined by the center part, out of said reference plane into an overlapping position with said center part while undergoing a height displacement, said side parts being elastic resiliently supported with respect to said center part, and stops provided on the vehicle body such that, upon movement of the cover to a closed position, said side parts engage said stops and are biased thereby against the elastic support between the center and side parts into the reference plane defined by said center part for a flush position with said center part.

2. A multipart cover according to claim 1, wherein said side parts are connected to said center parts by support members which are mounted to said center part and said side parts are elastically, resiliently supported by said support members.

3. A multipart cover according to claim 2, wherein said side parts are supported by said support member via a compression structure.

4. A multipart cover according to claim 2, wherein said side parts are supported by said support member via a tension spring structure.

5. A multipart cover according to claim 2, wherein each support member by which a side part is supported is connected to said center part by way of a pivot joint having a pivot axis extending normal to the reference plane defined by said center part.

6. A multipart cover according to claim 5, wherein said support member is mounted by said pivot joint so as to be axially immovable on said joint.

7. A multipart cover according to claim 2, wherein said support members are mounted to said center part with a height displacement with respect to said reference plane.

8. A multipart cover according to claim 7, wherein the height displacement of said support members with respect to said reference plane determines the height displacement of the side parts with respect to said reference plane.

9. A multipart cover according to claim 8, wherein the height displacement of said support members with respect to said reference plane is greater than the possible height displacement of the side parts.

10. A multipart cover according to claim 2, wherein said side parts are force-guided for movement with respect to the support members in the direction of the height displacement.

11. A multipart cover according to claim 2, wherein said support members are disposed in a position along a side of the center part when the side parts are moved sidewardly.

12. A multipart cover according to claim 11, wherein said support members are disposed in a vehicle transverse plane when the side parts are moved sidewardly.

13. A multipart cover according to claim 2, wherein said support members are disposed in the vehicle travel direction, in the front area of the side parts.

14. A multipart cover according to claim 13, wherein, in vehicle travel direction, the rear portions of the side parts are pivoted inwardly with respect to the center part to their overlapping position with the center part.

15. A multipart cover according to claim 2, wherein said support members are disposed, with respect to the vehicle travel direction, in rear area of the side parts.

16. A multipart cover according to claim 15, wherein, in vehicle travel direction, the front portions of the side parts are pivoted inwardly to their overlapping position with the center part.

17. A multipart cover according to claim 2, wherein said side parts are connected to the outer end areas of said support members.

18. A multipart cover according to claim 17, wherein said support members extend up to the edges of said side parts.

19. A multipart cover according to claim 2, wherein said support members are pivotally connected to said side parts.

20. A multipart cover according to claim 19, wherein the pivot axis between the support members and the side parts extends parallel to the reference plane when the side parts are in their sideward positions.

21. A multipart cover according to claim 20, wherein the pivot axis between said support member and said side parts extends in the longitudinal vehicle direction.

22. A multipart cover according to claim 20, wherein the pivot axis between said support member and said side parts extends transverse to the longitudinal extension of said support members.

23. A multipart cover according to claim 19, wherein said pivot axis between the support members and the side parts is displaceable in the direction of the height displacement.

24. A multipart cover according to claim 23, wherein the pivot axis between the support member and the side part is provided so as to permit sliding of said side parts relative to said support members along said pivot axis.

25. A multipart cover according to claim 23, wherein said side parts and said support members are spring-supported relative to each other in the area of said pivot axis.

26. A multipart cover according to claim 25, wherein said side parts and said support members are spring-biased toward one another.

27. A multipart cover according to claim 26, wherein said pivot axis is surrounded by a torsional coil spring having legs one of which is engaged by said support member and the other by said side part.

28. A multipart cover according to claim 1, wherein said stop is mounted to said vehicle so as to engage an edge of said side part which moves toward the vehicle body when the cover is closed.

29. A multipart cover according to claim 28, wherein said stop is so arranged that it engages the, in the vehicle travel direction, front edge of said side part when the side part is pivoted outwardly with respect to the center part.

30. A multipart cover according to claim 29, wherein said side part engages said stop with its front edge when it is in a closed position.

\* \* \* \* \*